W. E. Phelps,
Revolving Rake.

No. 99,589. Patented Feb. 8, 1870.

Witnesses.
F. S. Sprig
Wm A Morgan

Inventor.
W. E. Phelps.
per Munn & Co.
Attorneys

United States Patent Office.

W. E. PHELPS, OF ELMWOOD, ILLINOIS.

Letters Patent No. 99,589, dated February 8, 1870.

IMPROVEMENT IN HAY-GATHERERS.

The Schedule referred to in these Letters Patent and making part of the same.

*To all whom it may concern:*

Be it known that I, W. E. PHELPS, of Elmwood, in the county of Peoria, and State of Illinois, have invented a new and improved Hay-Gatherer; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

The nature and object of my improvement consists in providing a convenient machine for gathering and transporting hay, either from the windrows into cocks, or from windrows and cocks to the stack, whereby the draught upon the animals is lessened, the labor of the operator is lightened, and the efficiency of the machine is greatly increased, at the same time obviating all the objections to hay-gatherers of the same or like description hitherto in use, viz: oscillation, liability to clog, runners becoming choked, and dragging, thereby necessitating a re-raking of the field, and above all, obviating the necessity for the constant and immediate attention of the operator.

It also consists in the construction, combination, and arrangement of the various parts, as hereinafter more fully described.

A is the axle, to the middle of which the tongue B is attached, and to the ends of which the wheels C are attached, in the ordinary manner.

D are connecting-bars, the forward ends of which are pivoted to the axle A by bands $d^1$, passing around the said axle A, and the ends of which are attached to the said bars D, or in any other convenient manner, so that the rear ends of the said bars D may move up and down freely.

E is an axle or shaft, which is pivoted to the rear ends of the bars D, by means of the straps $d^2$, which pass around the said shaft E, and the ends of which are attached to the said bars D, or in any other convenient manner, so that the said shaft E may revolve freely.

F are the prongs or teeth, which are securely attached to the shaft E, and by means of which the hay is collected or taken up for transportation.

G are small wheels, placed upon axles or journals formed upon the ends of the shaft E, to support the machine when passing from place to place.

H are bars or standards, the forward ends of which are securely and rigidly attached to the shaft E, and the rear parts of which are connected and held in their proper relative position by the rounds or bars I, to serve as handles to control the machine, while being operated.

Figure 1:
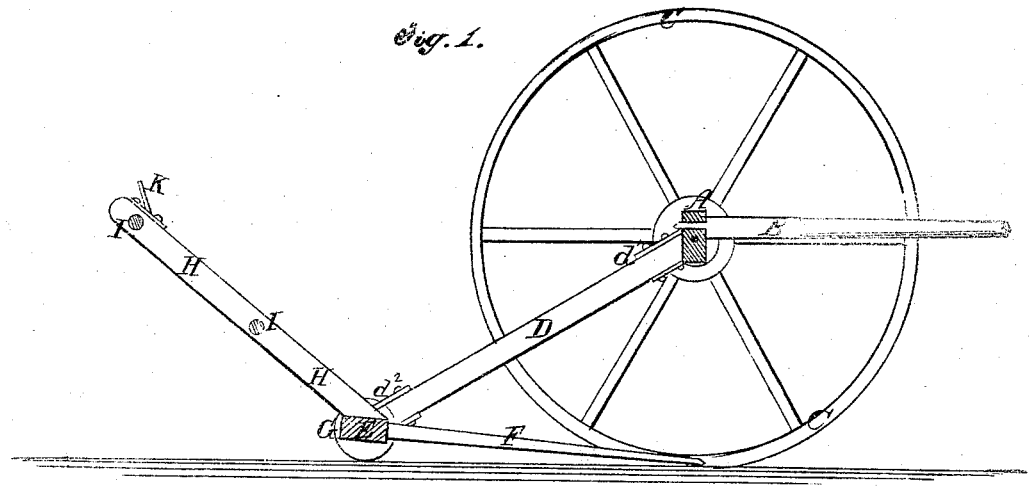
Figure 1 is a vertical longitudinal section of my improved hay-gatherer, taken through the line $x\,x$, fig. 2.
Figure 2:
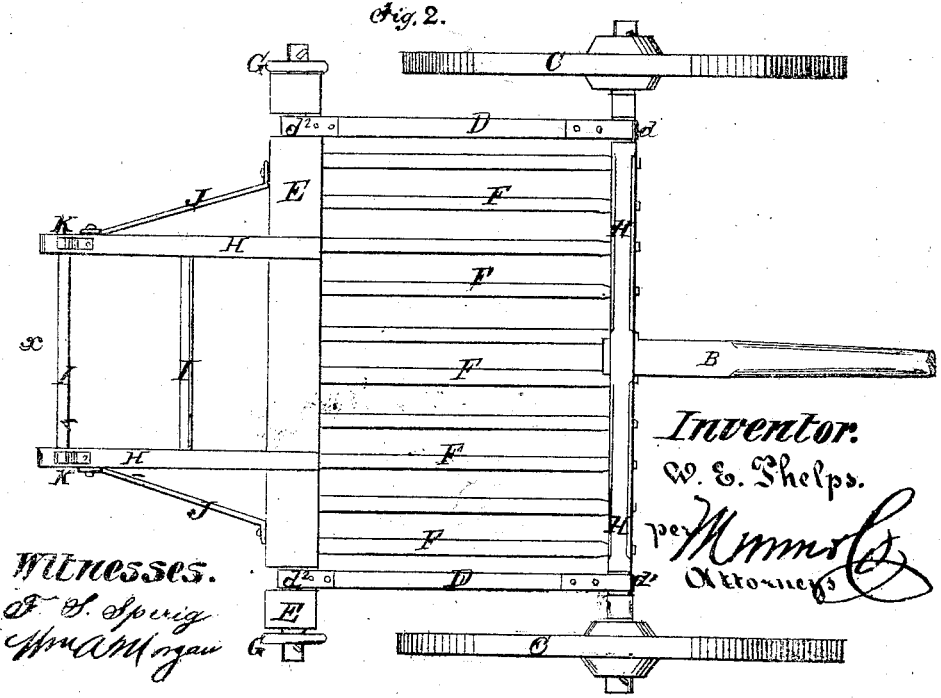
Figure 2 is a top or plan view of the same.

The bars or handles H are still further secured and strengthened by the braces J, the forward ends of which are attached to the shaft E, and the rear ends of which are attached to the said bars H, as shown in fig. 2.

When the gathered hay has been transported to the stack, the rear ends of the handles H I are raised slightly, so that the points of the prongs or teeth F may catch upon the ground, causing the shaft E to revolve in its bearings, and depositing the hay upon the ground, the part E F H I of the machine sliding over said hay, handle foremost.

As the handles strike the ground, the short prongs or arms K, attached to them, catch upon the ground, and revolve the machine again into a working position.

It should be observed that the machine, whether loaded or unloaded, may be so balanced upon the wheels G that the weight may be borne upon said wheels, thus, in a very great degree, lessening the friction, and consequently diminishing the draught.

I do not claim the parts of the invention of F. Wicks, secured by Letters Patent of June 23, 1868, or their mode or method of operation; but I do claim—

The arrangement of the revolving rake E F H, having trippers K, supported upon the bearing-wheels G, and connected, by draught-bars D, to the axle A, supported on wheels C, all being constructed and arranged substantially as described, for the purpose specified.

W. E. PHELPS.

Witnesses:
S. M. FARRAR,
T. H. TRACY.